United States Patent [19]

Harazoe et al.

[11] 4,034,335

[45] July 5, 1977

[54] AUTOMATIC SAFETY AND ALARMING APPARATUS FOR CONSTRUCTION EQUIPMENTS

[75] Inventors: Yoshiaki Harazoe; Shigeru Kurakami, both of Hirakata; Michio Okamoto, Ayase; Ichiro Hasegawa, Tokyo, all of Japan

[73] Assignee: Kabushiki Kaisha Komatsu Seisakusho, Tokyo, Japan

[22] Filed: Aug. 27, 1975

[21] Appl. No.: 608,261

[30] Foreign Application Priority Data

Aug. 30, 1974 Japan .............................. 49-98855

[52] U.S. Cl. .................. 340/52 F; 340/53; 340/267 R
[51] Int. Cl.² ..................... B60Q 5/00; G08B 19/00
[58] Field of Search ............. 340/52 F, 53, 267 C, 340/267 R, 60, 57, 52 R

[56] References Cited

UNITED STATES PATENTS

| | | | |
|---|---|---|---|
| 3,431,555 | 3/1969 | Leone | 340/60 |
| 3,540,028 | 11/1970 | Love | 340/267 R |
| 3,597,729 | 8/1971 | Lopez | 340/52 F |
| 3,866,166 | 2/1975 | Kerscher et al. | 340/52 F |
| 3,893,108 | 7/1975 | McBride, Jr. et al. | 340/52 F |
| 3,944,969 | 3/1976 | Arai et al. | 340/52 F |
| 3,949,356 | 4/1976 | Fuzzell et al. | 340/52 F |
| 3,964,018 | 6/1976 | Strait et al. | 340/52 F |

*Primary Examiner*—Glen R. Swann, III
*Attorney, Agent, or Firm*—Spensley, Horn and Lubitz

[57] ABSTRACT

Abnormal conditions of the engine and auxiliary machines mounted on a construction equipment are detected by sensors and individually displayed by a plurality of abnormal condition display circuits connected to respective sensors, for the purpose of alarming and displaying any one of the abnormal conditions there are provided a logical sum circuit connected to receive abnormal signals from all abnormal condition display circuits and an alarming circuit energized by the output from the logical sum circuit for giving audible and visible alarms. Further, there are provided a delay circuit connected to receive the output of a sensor provided for the engine system and a deceleration mechanism operated by the output from the delay circuit for decreasing the speed of the engine or stopping it when an abnormal condition occurs in the engine system.

3 Claims, 10 Drawing Figures

|     |   |   |     |     |
|-----|---|---|-----|-----|
| $a_1$ | L | H | L   | H   |
| $b_1$ | H | L | H   | L   |
| $c_1$ | L | H | H   | L   |
| $d_1$ | H | H | (L) | H   |
| $e_1$ | L | H | H   | H   |
| $f_1$ | H | L | L   | H   |
| $g_1$ | H | H | H   | (L) |

|     |   |   |     |   |
|-----|---|---|-----|---|
| $a_2$ | L | L | H   | H |
| $b_2$ | H | L | H   | L |
| $c_2$ | L | L | (H) | L |

AUTOMATIC SAFETY AND ALARMING APPARATUS FOR CONSTRUCTION EQUIPMENTS

BACKGROUND OF THE INVENTION

This invention relates to automatic safety and alarming apparatus for construction equipments such as a bulldozer which automatically alarms an abnormal condition of various machines and apparatus mounted on the equipment thereby preventing damage of the machines and apparatus.

Various machines and apparatus are mounted on a construction equipment having a complicated construction such as a bulldozer. If one of the machines and apparatus becomes out of order, the equipment can not run or operate. For this reason, it is common to carefully inspect the equipment before operation. However, if such inspection is made by using an instrument meter, the meter is often misread due to the vibration of the equipment or by the personal error of the operator so that the fault can not be correctly detected. This causes a fault during the operation of the equipment. Most of the faults occurring during the operation are difficult to readily repair or require exchange of damaged parts, so that such repair or replacement require much time and labour.

SUMMARY OF THE INVENTION

Accordingly, it is an object of this invention to provide a new and improved safety and alarming apparatus for use in a construction equipment which, in response to an abnormal condition of the machines and apparatus mounted on the equipment, gives an alarm to the operator while at the same time stopping or decreasing the speed of the engine of the equipment, thereby preventing the damage of the equipment and the decrease in the operating efficiency.

Another object of this invention is to provide an improved safety and alarming apparatus for use in a construction equipment such as a bulldozer provided with means for eliminating the adverse effect of the vibration of the equipment and chattering of the switch contacts.

A further object of this invention is to provide an improved safety and alarming apparatus including means for preventing the misoperation thereof at the time of starting the engine.

According to this invention, these and further objects can be accomplished by providing an automatic safety and alarming apparatus for a construction equipment comprising a plurality of sensors each provided for an engine and various auxiliary machines which are mounted on the equipment for detecting abnormal conditions of the engine and the auxiliary machines, a plurality of abnormal condition display circuits respectively connected to receive the abnormal signals produced by respective sensors for independently displaying the abnormal conditions, a logical sum circuit connected to receive the abnormal signals from respective abnormal condition display circuits, an abnormal condition alarming circuit including an audible alarm and a visible alarm and connected to receive the output from the logical sum circuit for alarming and displaying any one of the abnormal conditions, a delay circuit connected to receive the output of a sensor provided for the engine system, and a deceleration mechanism operated by the output from the delay circuit for decreasing the speed of the engine or stopping the same when the abnormal conditions occurs in the engine system.

While the speed of the engine is low as at the time of starting a sensor that detects the abnormal condition of the pressure of the engine lubricating oil may cause a misoperation. It is also a feature of this invention to provide means disenabling such sensor while the engine speed is below a predetermined speed.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
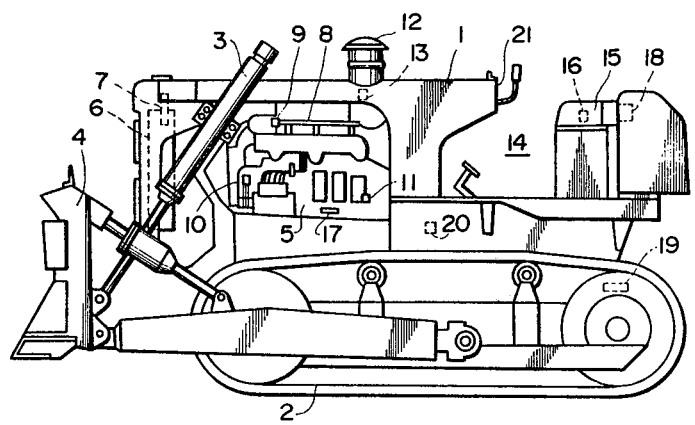
FIG. 1 is a side view of a construction equipment on which the alarming apparatus of the invention is mounted.
Figure 3:
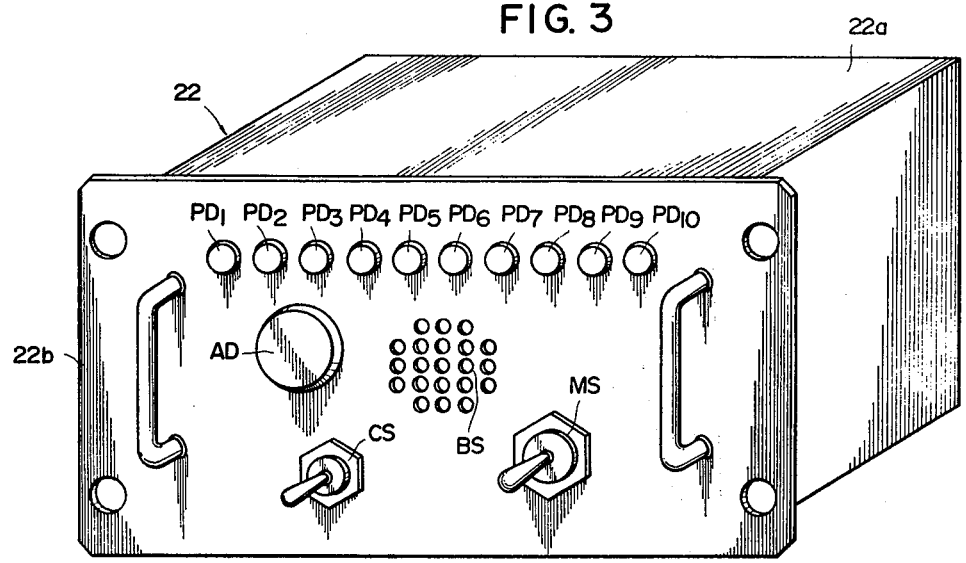
FIG. 3 is a perspective view of the display panel of the alarming apparatus of this invention.

In the following, the invention will be described as applied to a bulldozer. The bulldozer shown in FIG. 1 comprises a main body 1 operated by endless belts 2. A plow 4 is mounted on the front side of the main body 1 and operated in the vertical direction by a lift cylinder 3. A diesel engine 5 for running and operating the bulldozer is mounted on the fore portion of the main body 1. Various sensors are mounted on the diesel engine 5 and various portions of the body 1. For example, a water level sensor 7 (for example, in the form of a float switch) is contained in a radiator 6 disposed in front of the engine 5 for detecting the level of the cooling water in the radiator 6, and a temperature sensor 9, in the form of a thermal switch for example, is located in the circulation pipe 8 for circulating the cooling water through the radiator 6. Further, a speed sensor 10 in the form of a reed switch, for example, for detecting the number of revolutions of the engine and an oil pressure sensor 11 in the form of a pressure switch, for example, for detecting the pressure of the lubricating oil are also mounted on the engines. A clogging detecting sensor 13 is provided for an air cleaner 12 positioned at an air intake port. Further, a temperature detecting sensor 20 in the form of a thermal switch, for example, is provided for the fluid speed changing mechanism for detecting the temperature of the torque converter oil, and a clogging detecting sensor 16 in the form of a pressure differential switch, for example, is located in the fuel tank 15 on the rear side of the driver's seat 14 for detecting the clogging of a fuel oil filter. There are also provided a sensor 17 for detecting the clogging of the engine oil filter, a sensor 18 for detecting the quantity of the fuel oil and a sensor 19 for detecting the amount of wear of the brake lining. These sensors are connected to a display panel 22 mounted on the front panel 21 in front of the driver's seat 14 through the circuit shown in FIG. 2. The display panel 22 and the circuit shown in FIG. 2 (excluding various sensors) are contained in a casing 22a, and an instrument panel 22b is mounted on the front end of the casing 22a as shown in FIG. 3. A plurality of display means $PD_1$ through $PD_{10}$, luminous diodes, for example, are mounted on the instrument panel 22b along a horizontal line. An abnormal condition indicator AD a buzzer BS, a check switch CS for inspecting the condition of various parts, and a manual switch MS utilized at the time of emergency are also mounted on the instrument panel 22b. These display means, switches, etc. are connected as shown in FIG. 2.

Figure 2:
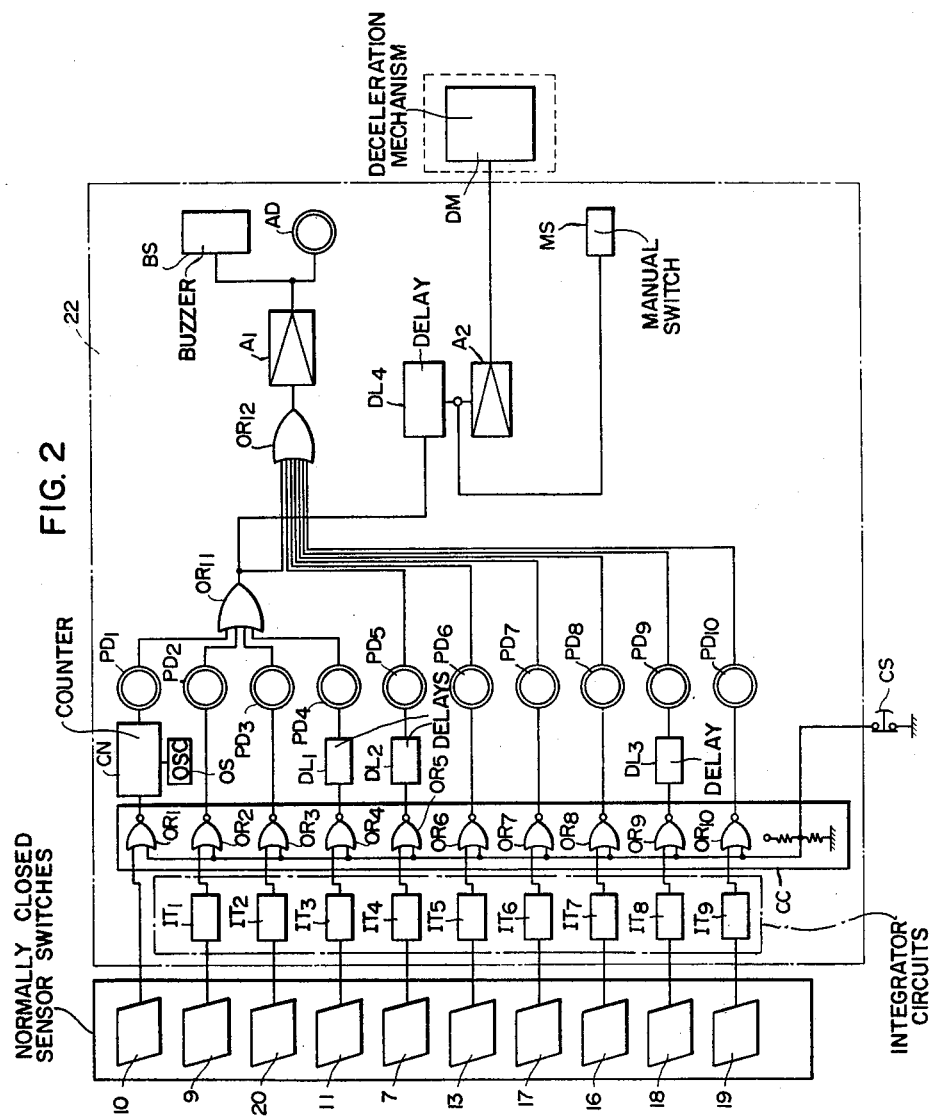
FIG. 2 is a block diagram showing the electrical connection of one embodiment of this invention.
Figure 4:
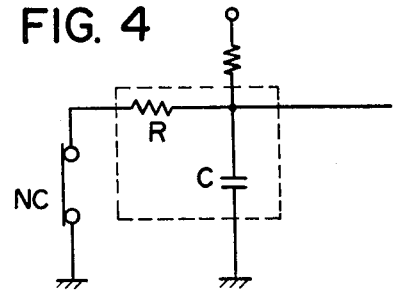
FIG. 4 is a circuit diagram showing one example of the integrating circuit shown in FIG. 2.

The circuit shown in FIG. 2 includes 10 OR gate circuits $OR_1$ through $OR_{10}$ for respective sensors 10, 9, 20, 11, 7, 13, 17, 16, 18 and 19. The OR gate circuits $OR_2$ through $OR_{10}$ are respectively connected to the normally closed contacts of the sensors through integrating circuits $IT_1$ through $IT_9$ respectively, whereas the OR gate circuit $OR_1$ is connected directly to the normally closed contact of the speed sensor 10 of the engine. Each OR gate circuit is constructed to produce an output whenever an input is applied to either one of two input terminals thereof. One of the inputs of each OR gate circuit is connected to its respective sensor and the other inputs are commonly connected to the normally closed contacts of the check switch CS. The integrating circuits $IT_1$ through $IT_9$ are provided for preventing misoperations caused by the variation in the liquid levels due to the vibration of the equipment, or the chattering of the sensor contacts. FIG. 4 shows one example of an RC integrating circuit utilized as the integrating circuits $IT_1$ through $IT_9$. A counter CN is connected between the output of the OR gate circuit $OR_1$ connected to the engine speed sensor 10 and an abnormal condition display means PD1, the counter CN being normally driven by an oscillator OS with a pulse signal having a frequency corresponding to the overspeed of the engine. Between the OR gate circuits $OR_5$, $OR_4$ and $OR_9$ respectively connected to the sensor 7 for detecting the water level in the radiator, sensor 11 for detecting the pressure of the engine lubricating oil and the sensor 18 for detecting the oil level, and respective abnormal condition display means $PD_5$, $PD_4$ and $PD_9$ are connected delay circuits $DL_1$, $DL_2$ and $DL_3$ for delaying by a predetermined interval the signals applied to the display means $PD_5$, $PD_4$ and $PD_9$ from respective sensors.

The display means $PD_1$ through $PD_4$ respectively connected to the speed sensor 10, sensor 9 for detecting the temperature of the engine cooling water, sensor 20 for detecting the temperature of the torque converter oil and the sensor 11 for detecting the pressure of the engine oil are connected to the inputs of an OR gate circuit $OR_{11}$ whereas remaining display means $PD_5$ through $PD_{10}$ are connected to the inputs of another OR gate circuit $OR_{12}$. The output of this OR gate circuit is connected to an abnormal condition display device AD, for example a red lamp, and the buzzer BS through an amplifier $A_1$ while the output of the OR gate circuit $OR_{11}$ is connected to deceleration mechanism DM via a delay circuit $DL_4$ and an amplifier $A_2$. The emergency manual switch MS is connected to the juncture between the delay circuit and $DL_1$ and the amplifier $A_2$. The emergency manual switch MS is an automatic.

Figure 5:
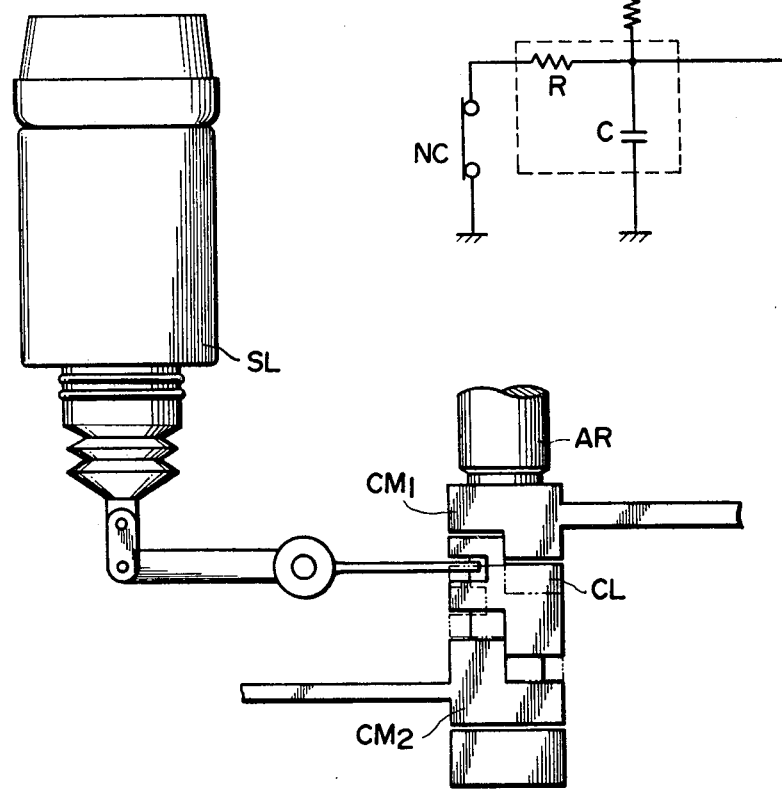
FIG. 5 shows the detail of the deceleration mechanism shown in FIG. 2.

FIG. 5 shows the construction of the deceleration mechanism DM comprising an electromagnetic solenoid SL energized by the abnormal signal for driving a clutch CL mounted on a shaft AR interlocked with a deceleration pedal (not shown). On the shaft AR and on both sides of the clutch CL are mounted a first cam $CM_1$ interlocked with an acceleration pedal not shown, and a second cam $CM_2$ interlocked with a throttle lever of the engine, now shown. During normal operation these cams are coupled together by clutch CL so as to transmit the operating force of the acceleration pedal to the engine throttle lever. However, when the electromagnetic solenoid SL is energized by the abnormal signal, the clutch CL is moved to the dotted line position thus interrupting the connection between the cams $CM_1$ and $CM_2$. Under these condition, the throttle lever is automatically returned to the low speed idle position by its restoring spring, not shown. Disengagement of the clutch CL prevents the acceleration pedal from accelerating the engine 5. To accelerate the engine the emergency manual switch MS is closed and then the acceleration pedal is returned to the minimum fuel injection position thereby enabling the acceleration of the engine. As above described, since the emergency switch M5 is of the automatic reset type, unless the emergency signal is removed, when the operator releases the emergency switch the engine will be slowed down again.

The sensor 11 for detecting the pressure of the engine lubricating oil is constructed such that it produces an abnormal signal when the oil pressure decreases below 1 $kg/cm^2$, for example, so that there is likelihood that the sensor 11 may produce an abnormal signal when the oil pressure is low as at the time of starting the engine.

Figure 6:
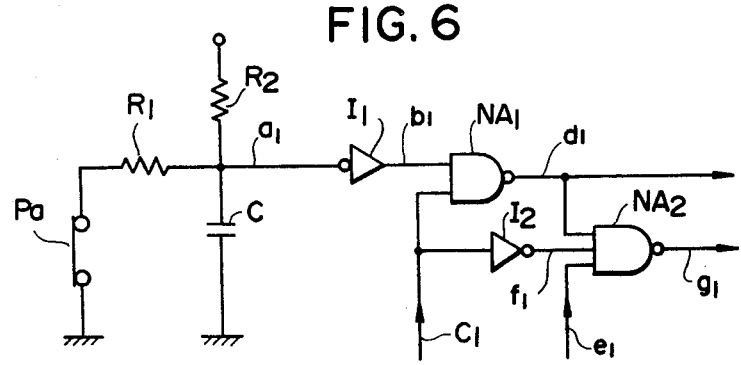
FIG. 6 is a circuit diagram of one example of the alarm eliminating circuit which is effective at the time of starting.

To obviate this difficulty, an alarm eliminating circuit is provided for the sensor 11 as shown in FIG. 6. The contact of the oil pressure switch is designated by Pa which is opened when the oil pressure exceeds a predetermined value but closed when the oil pressure decrease below the predetermined value. One terminal of the contact Pa is grounded and the other terminal is connected to one input of a NAND gate circuit $NA_1$ via an inverter $I_1$. The other input of the NAND gate circuit is connected to receive an input $C_1$ from a generator, not shown, driven by the engine and the output signal from the NAND gate circuit $NA_1$ represents the pressure of the engine lubricating oil. This output signal is applied to one input of another NAND gate circuit $NA_2$, the second input thereof being applied with the signal $C_1$ from the generator, via an inverter $I_2$. The third input of the NAND gate circuit $NA_2$ is applied with a signal $e_1$ from a source switch (not shown).

Since the pressure of the engine lubricating oil is low at the time of starting the engine, the contact Pa is closed as shown and, accordingly, the level of the signal applied to the input of inverter $I_1$ is low(L) and the output thereof will be at a high level H. During starting the signal $C_1$ from the generator is also at the low level L, the output $d_1$ from the NAND gate circuit $NA_1$ is at the high level H. For this reason, during starting abnormal signal L of the oil pressure is not produced.

As the engine speed and hence the oil pressure increase, the contact Pa is opened so that the $b_1$ output $b_1$ of the inverter $I_1$ will have low level L and the generator output $C_1$ high level H. Accordingly, no oil pressure abnormal signal is produced. If for same reason the oil pressure decreases, the output from the NAND gate circuit $NA_1$ will become low level L thus producing an oil pressure abnormal signal for operating the alarm device.

The NAND circuit $NA_2$ is provided for the purpose of detecting the breakage of a fan belt. Thus, when the fan belt breaks while the oil pressure is normal, the generator output $C_1$ decreases. Under these conditions, since the oil pressure is normal, the output $d_1$ from the NAND gate circuit $NA_1$ is at a high level, the generator output $C_1$ is at a low level L, and the source voltage is at a high level H so that the output from the NAND gate circuit $NA_2$ becomes low level L whereby the signal indicating the abnormal condition of the fan belt is produced. The circuit for operating the alarm device in response to this signal is not shown in FIG. 2 but can be constructed in a manner similar to the circuits associated with other sensors.

Figures 7, 8, 9:
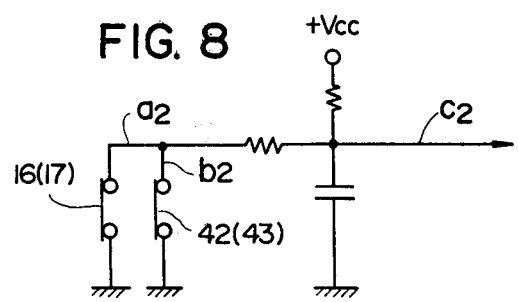
FIG. 7 is a table showing the levels of the signals at various portions of the circuit shown in FIG. 6.
FIG. 8 is a circuit diagram showing one example of a circuit for preventing misoperation of a sensor provided for an oil filter.
FIG. 9 is a table showing the levels of the signals at various portions of the circuit shown in FIG. 8.

FIG. 7 is a table showing the levels of the signals at various portions of the circuit shown in FIG. 6.

As described above, as the sensors 16 and 17 for detecting the clogging of the filters for the fuel oil and the engine lubricating coil are used pressure differential switches. However, the resistance of the oil filters varies in accordance with the variation in the viscosity of the fuel oil and the lubricating oil. For this reason, where the viscosity of the oil is high, especially at the time of starting the engine, the sensors 16 and 17 constructed to respond to the pressure difference between the inlet and outlet sides often produce alarm signals. This difficulty can be obviated by connecting the normally closed contacts of sensors 42 and 43 which detect the temperature of the fuel oil and the lubricating oil respectively in parallel with the sensors 16 and 17 as shown in FIG. 8. More particularly, the contacts of the sensor 16 adapted to detect the clogging of the lubricating oil filter and opened when the differential pressure exceeds a predetermined value and closed when the differential pressure decreases below the predetermined value. In the same manner, the contacts of the sensor 42 adapted to detect the temperature of the lubricating oil are opened when the oil temperature exceeds a predetermined value but are closed when the temperature of the lubricating oil decrease below the predetermined value. Accordingly, the level of the output $C_2$ becomes H only when both contacts 16 and 42 are opened, that is, the differential pressure is high and the temperature of the lubricating oil is also high. The signal $C_2$ is used as the clogging detection signal. The table shown in FIG. 9 shows the levels of the signal at various portions of the circuit shown in FIG. 8.

Figure 10:
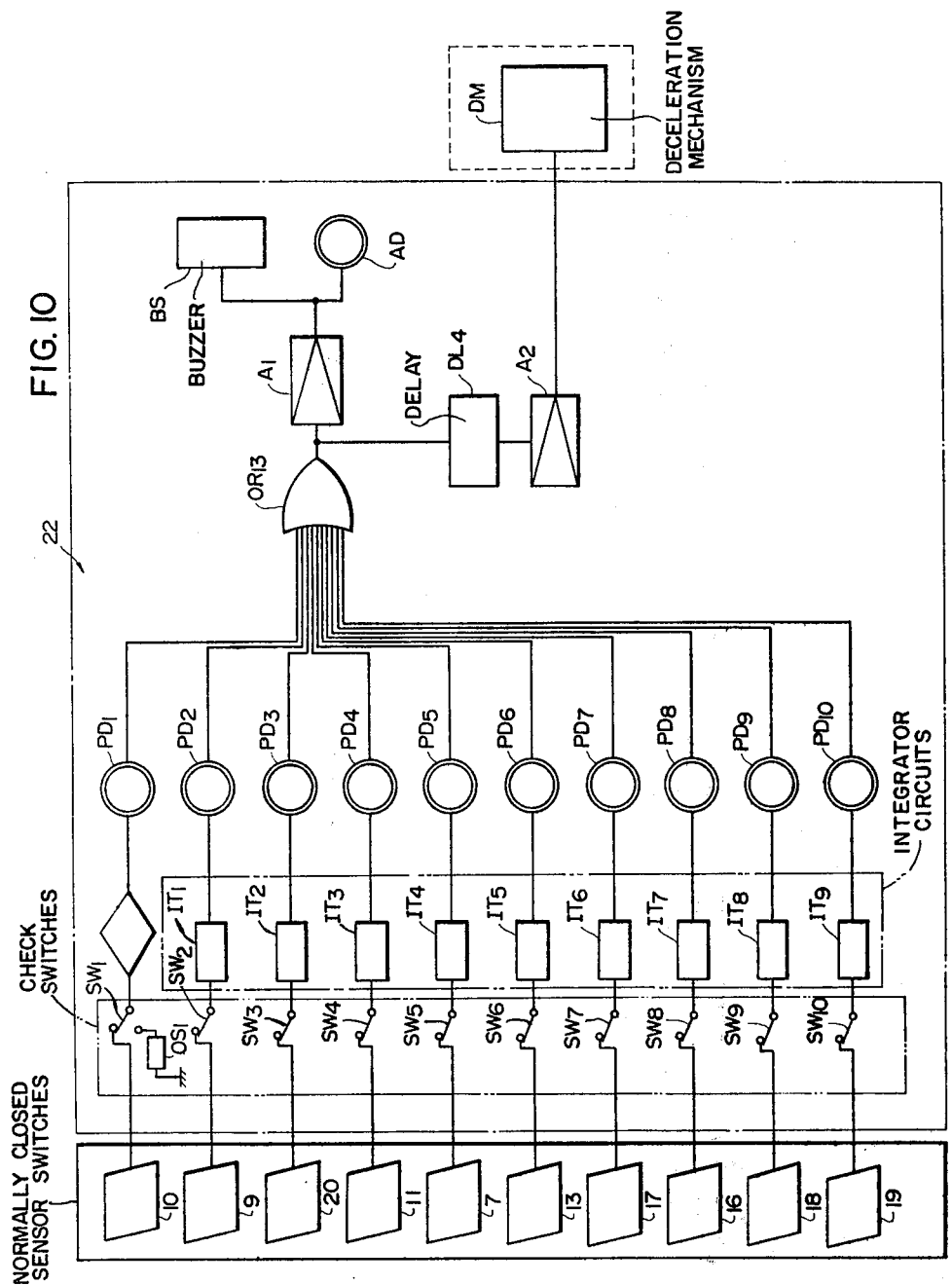
FIG. 10 is a block diagram showing another embodiment of this invention.

FIG. 10 shows a modification of the alarming apparatus of this invention which is different from the previous embodiment in that the deceleration mechanism DM is connected to be operated by the abnormal signals from all sensors, that the check switch CS and the OR gate circuits $OR_1$ through $OR_{10}$ are substituted by check switches $SW_1$ through $SW_{10}$ which are connected to respective sensors, and that the delay circuits $DL_1$, $DL_2$ and $DL_3$ are omitted.

With this connection, where any one of the sensors produces an abnormal signal, OR gate circuit $OR_{13}$ produces an output which is amplified by amplifier $A_1$ to operate buzzer BS and light display lamp AD thus informing the operator of the occurrence of an abnormal condition. The output from the OR gate circuit $OR_{13}$ is delayed a definite interval by delay circuit $DL_4$ and then applied to the deceleration mechanism DM through amplifier $A_2$ thus decreasing the speed of the engine or stopping the same.

What is claimed is:

1. An automatic safety and alarm apparatus for construction equipment comprising a plurality of sensors provided for an engine and various auxiliary devices which are mounted on said equipment for detecting the abnormal condition of said engine and said auxiliary devices, a plurality of abnormal condition display circuits respectively connected to receive the abnormal signals produced by respective sensors for independently displaying said abnormal conditions, a logical sum circuit connected to receive abnormal signals from the abnormal condition display circuit, an abnormal condition alarming circuit including an audible alarm and a visible alarm and connected to receive the output from said logical sum circuit for alarming and displaying any one of said abnormal conditions, a delay circuit connected to receive the output of a sensor provided for the engine, and a deceleration mechanism operated by the output from said delay circuit for decreasing the speed of the engine or stopping the same when an abnormal condition occurs in the engine, said deceleration mechanism comprising an electromagnetic solenoid energized by the output from said delay circuit, a first cam interlocked with an acceleration pedal, a second cam interlocked with a throttle lever of said engine, and a means responsive to the energization of said electromagnetic solenoid for coupling and decoupling said first and second cams from each other.

2. The automatic safety and alarming apparatus according to claim 1 which further comprises a sensor which detects the breakage of the fan belt by sensing when the pressure of the engine lubricating oil is normal and the generator voltage is simultaneously less than a predetermined value.

3. The automatic safety and alarming circuit of claim 1 wherein each of said abnormal condition display circuits is provided with a check circuit which produces a check signal which is the same as the abnormal signals.

* * * * *